United States Patent [19]

Miyoshi

[11] Patent Number: 5,222,811
[45] Date of Patent: Jun. 29, 1993

[54] LEAD WIRE CONNECTION FOR A TEMPERATURE SENSOR

[75] Inventor: Sotsuo Miyoshi, Hyogo, Japan

[73] Assignee: Mitsubishi Denki Kabushiki Kaisha, Hyogo, Japan

[21] Appl. No.: 870,668

[22] Filed: Apr. 17, 1992

[30] Foreign Application Priority Data

Apr. 19, 1991 [JP] Japan .................. 3-88063

[51] Int. Cl.⁵ .................. G01K 1/08; H01R 4/02
[52] U.S. Cl. .................. 374/208; 374/163; 174/94 R; 439/874
[58] Field of Search .............. 374/208, 163, 144, 145; 219/56.1, 56.21, 56.22, 85.18; 174/94 R; 439/874, 875, 876

[56] References Cited

U.S. PATENT DOCUMENTS

| | | | |
|---|---|---|---|
| 1,875,241 | 8/1932 | Idank | 439/874 |
| 2,356,237 | 8/1944 | Geller | 174/94 R |
| 2,655,641 | 10/1953 | Asaff | 439/874 |
| 2,906,987 | 9/1959 | Fox, Jr. | 174/94 R |
| 3,084,546 | 4/1963 | Ney | 374/163 |
| 3,263,952 | 8/1966 | Fisher | 374/208 |
| 3,437,774 | 4/1969 | Snider | 439/875 |
| 3,593,002 | 7/1971 | Hebert | 439/874 |
| 3,729,574 | 4/1973 | Weiner | 174/94 R |
| 3,779,079 | 12/1973 | Snook | 374/208 |
| 4,231,041 | 10/1980 | Graeser, Jr. | 174/94 R |
| 5,088,836 | 2/1992 | Yamada et al. | 374/208 |

FOREIGN PATENT DOCUMENTS

| | | | |
|---|---|---|---|
| 1949957 | 4/1971 | Fed. Rep. of Germany | 174/94 R |
| 1359893 | 3/1964 | France | 174/94 R |
| 61-296229 | 12/1986 | Japan | 374/208 |
| 2045433 | 10/1980 | United Kingdom | 374/208 |
| 2243484 | 10/1991 | United Kingdom | 374/163 |

Primary Examiner—William A. Cuchlinski, Jr.
Assistant Examiner—G. Bradley Bennett

[57] ABSTRACT

A temperature sensor has a holder for housing a temperature sensing element therein, a terminal, and an electrical lead wire connecting the temperature sensing element and the terminal. The lead wire has a first end portion thereof electrically connected with the temperature sensing element and a second end portion thereof welded to the terminal. The lead wire is fastened in a variety of ways to the terminal to receive mechanical loads exerted by the lead wire. The terminal may be formed with a hole therein through which the lead wire is passed from one side of the terminal to the other. The lead may be soldered to the terminal at the hole. The terminal may also be formed with a cutout through which the lead wire is passed and is soldered at a portion closer to the temperature sensing element than the cutout. The terminal may be formed with two slits to define a strap between the two slits so that the lead wire is passed through the first slit from a first side of the terminal to a second side and then through the second slit from the second side to the first side. The lead is then soldered to the terminal at a portion of terminal closer to the temperature sensing element than the strap.

8 Claims, 5 Drawing Sheets

LEAD WIRE CONNECTION FOR A TEMPERATURE SENSOR

BACKGROUND OF THE INVENTION

1. Field of the Invention

The present invention relates to a temperature sensor and more particularly to an improved connection between a terminal and a lead extending from a temperature sensing element.

2. Prior Art

FIG. 10 shows a conventional temperature sensor 1 used for measuring the temperature of cooling water of an automobile. The temperature sensor 1 has a holder 2 made of brass and is dipped into the cooling water of the automobile flowing in the direction of arrow 11. The holder 2 has an elongated protection tube 2a downwardly extending to a bottom of the holder 2. The holder 2 has on an upward end thereof a radially projecting hexagonal flange 2b to which a mounting tool fits when the temperature sensor 1 is mounted to an engine. The holder 2 has a threaded portion 2c below the hexagonal flange 2b, so that the holder 1 is mounted by screwing into a cylinder wall 12 of the engine. The protection tube 2a houses a temperature sensing element 3 in the form of thermistor connected to a lead 4. The temperature sensing element 3 and the lead 4 are embedded in a protective resin filled into the holder 2. The protective resin 5 forms a connector body 6 upwardly extending from the opening of the holder 2. A terminal 7 is connected with the end portion of lead 4 and projects into a socket receiving recess 6a. The connection at which the terminal 7 is connected with the lead 4 is also embedded in the protective resin 5. The terminal 7 is an elongated plate like terminal, as shown in FIG. 11, which is gold-plated for good conduction of a very small current. The lead 4 is soldered at 8 to the surface of terminal 7. A tube 9 covers the lead 4 to protect and insulate it from surroundings. A cap 10 serves as a simple water-proofing material for the temperature sensing element 3.

The prior art temperature sensor 1 of the aforementioned construction operates to determine the change in the temperature of cooling water in terms of the change in resistance of the temperature sensing element 3 firmly supported in the protective tube 2a. Generally, very small electric power is used when measuring the temperature, so that heat generation due to the current through the thermistor is as low as possible. In fact, the current through the thermistor is in the range from 100 uA to 2 mA. The temperature sensor 1 is capable of measuring as wide a temperature range as −40 to +130 degrees.

With the prior art temperature sensor, the linear expansion of leads 4 due to elevated temperatures is different from that of resin 5 that holds the temperature sensing element 3 and the leads 4, resulting in the differences in repetitive tensile forces exerted on the lead during heat cycle. The tensile forces are exerted as mechanical loads to the solder 8, which forces tend to pull the leads 4 off the terminal 7. Consequently, the soldered portion gradually loses the effect of securing the leads to the terminal 7 in the long run. The resultant poor soldering effect results in a poor electrical contact between the lead 4 and terminal 7.

SUMMARY OF THE INVENTION

An object of the invention is to provide a temperature sensor having an electrical connection immune to mechanical loads exerted by a lead wire due to different thermal expansion coefficients during heat cycle.

A temperature sensor has a holder for housing a temperature sensing element therein, a terminal, and an electrical lead wire. The lead wire has a first end portion thereof electrically connected with the temperature sensing element and a second end portion thereof welded to the terminal. The lead wire is further fastened to the terminal at a portion near the second end portion in a variety of ways so that the mechanical loads are not directly exerted to the second end portion by the lead wire. The terminal may be formed with a hole through which the lead wire is passed and is soldered thereat. The terminal may be formed with a cutout through which the lead wire is passed and is soldered to the terminal at a position closer to the temperature sensing element than the cutout. The terminal may be formed with two slits to define a strap between the two slits, so that the lead wire passes through the first slit from a first side of the terminal to a second side and then from the second side to the first side through the second slit. The lead is soldered to the terminal at a position closer to the temperature sensing element than the strap.

BRIEF DESCRIPTION OF THE DRAWINGS

Features and other objects of the invention will be more apparent from the description of the preferred embodiments with reference to the accompanying drawings in which.

DETAILED DESCRIPTION OF THE INVENTION

Embodiments of a temperature sensor according to the invention will now be described in detail with reference to the drawings.

First embodiment

Figure 1:
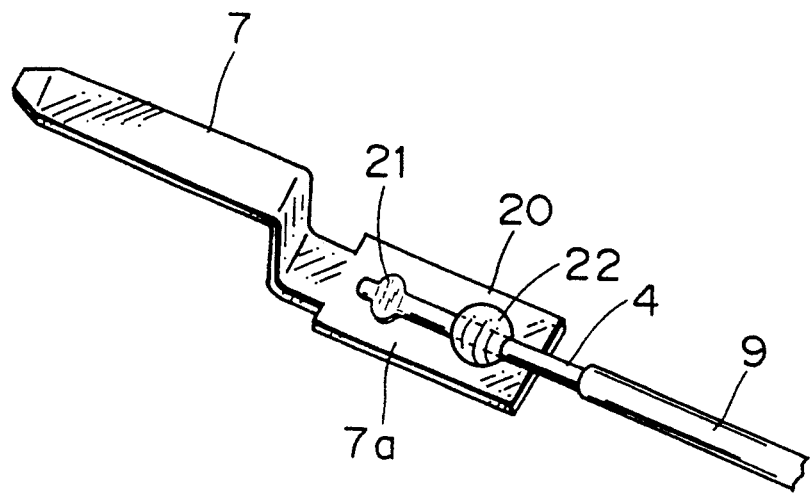
FIG. 1 shows a first embodiment of a temperature sensor according the invention.

FIG. 1 shows a first embodiment of the invention. In the figure, two leads 4 extend along surfaces 7a of terminals 7 and the end portions of the leads 4 are welded at 21 to the surface 7a. Only one of two leads 4 is shown in FIG. 1. The leads 4 are soldered at 22 to the surface 7a. The lead 4 is welded at 21 before being soldered at 22, so that the soldered connection 22 is not adversely affected by an excessive heat generated during welding.

When the temperature sensor is exposed to large temperature differences during heat cycle, mechanical loads or stresses are exerted on the lead due to different thermal expansion coefficients of leads 4 and resin 5. However, any mechanical load exerted on the leads 4 during heat cycle is first received by the soldered connection 22 which is closer to a temperature sensing element 3 than the welded connection 21. Thus, the welded connection 21 is not directly exposed to mechanical stresses or loads.

Generally speaking, when the lead is welded, the cross section of the lead is deformed due to excessive heat and loses mechanical strength thereof considerably. This is another reason why the lead 4 is soldered at 22. The soldered portion serves to prevent the welded portion, which has lost a considerable mechanical strength, from coming off the terminal 7.

Second and third embodiments

Figure 2A:
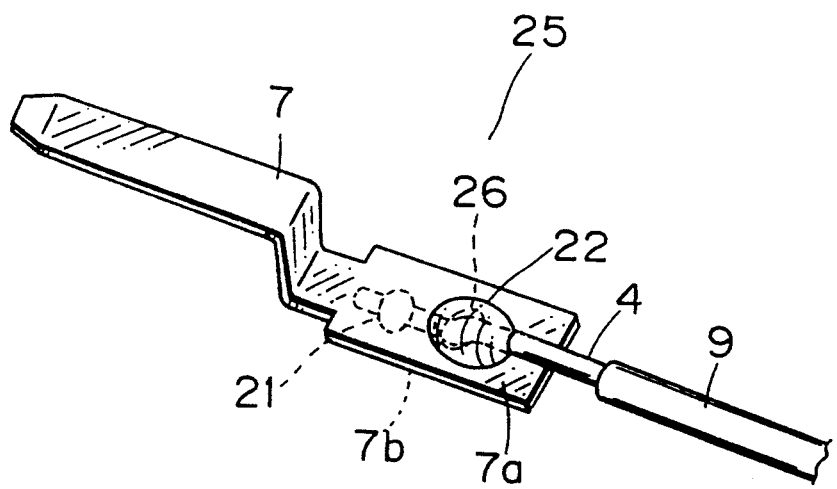
FIG. 2A shows a second embodiment of the invention.
Figure 2B:
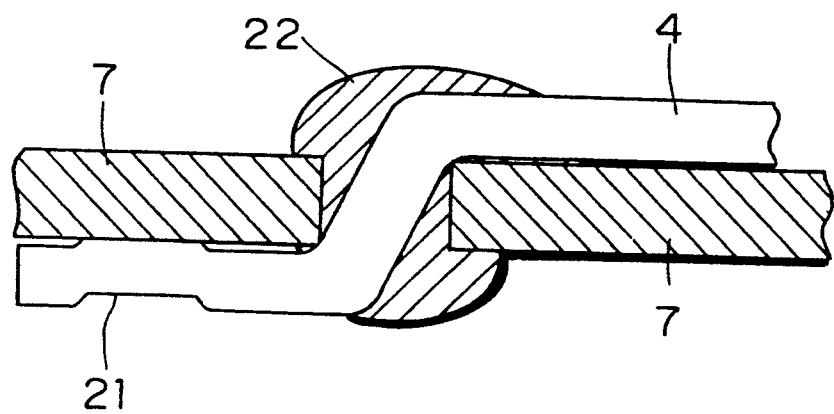
FIG. 2B shows a fragmentary cross-sectional view of the FIG. 2A.
Figure 3:
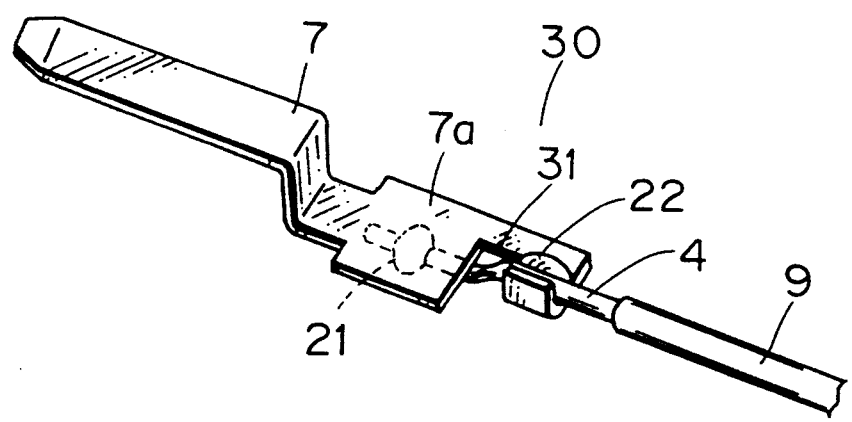
FIG. 3 shows a third embodiment of the invention.

FIGS. 2 and 3 show a second and third embodiments of the invention. In FIG. 2, the plate like elongated terminal 7 is formed with a hole 26 therein through which the lead 4 passes to one side of the terminal to the other and is welded at its end portion to the reverse surface 7b of terminal 7. The lead 4 is soldered at 22 to the surface 7a of terminal 7 using a solder similar to that used in the prior art apparatus. The lead 4 extends substantially parallel to the front and reverse surfaces of the terminal except for the kinked portion of lead 4 in the hole 26. It should be noted that the soldered connection 22 is positioned closer to the temperature sensing element 3 than the welded connection 21.

In FIG. 3, the plate like terminal 7 is formed with a cutout 31 therein through which the lead 4 passes from one side of the terminal to the other and is welded at its end portion 21 to the reverse surface 7b of terminal 7. The lead 4 is soldered at 22 to the surface 7a of terminal 7. Again, it should be noted that the soldered connection 22 is closer to the temperature sensing element 3 than the welded connection 21. The kinked portion of lead 4 serves to mechanically fasten the lead 4 to the terminal 7, and cooperates with the soldered connection 22 to prevent the welded connection 21 from being exerted mechanical loads or stresses. When the lead 4 is soldered at the hole 26, the melted solder tends to flow into the hole, so that the hole 26 serves just like a "through hole" of a printed circuit board enhancing mechanical strength of the connection 22.

Fourth embodiment

Figure 4:
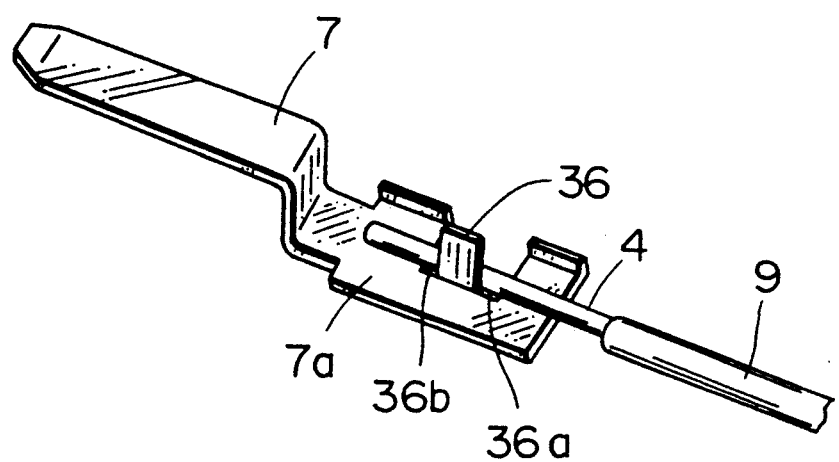
FIGS. 4–5 show a fourth embodiment of the invention, FIG. 5A showing the lead soldered and FIG. 5B a cross-sectional view of FIG. 5A.

FIGS. 4 and 5 show a fourth embodiment of the invention. In FIG. 4, the terminal 7 is formed with two slits 36a and 36b therein which form a strap 36 therebetween. The strap 36 is then bent to be positioned upright leaving a cutout across which the lead 4 extends. Then, the strap 36 is bent back to its original position so as to forcibly extrude the lead to project to the other surface of the terminal 7 such that the lead 4 is kinked into a substantial U-shape. The lead 4 is welded at its end portion and is soldered at slit 36a to the surface 7a of terminal 7.

The forcibly extruded kinked portion of lead 4 serves as a fastening means to fasten the lead 4 to terminal 7. The kinked portion cooperates with the soldered connection 22 to prevent the welded connection from being exerted tensile mechanical loads or stresses by the lead 4 during heat cycle. While the second and third embodiments are not quite suitable for quantity production, the fourth embodiment is more suitable for quantity production at low costs since the lead may be readily assembled to the terminal.

Fifth, sixth, and seventh embodiments

Figure 5A:
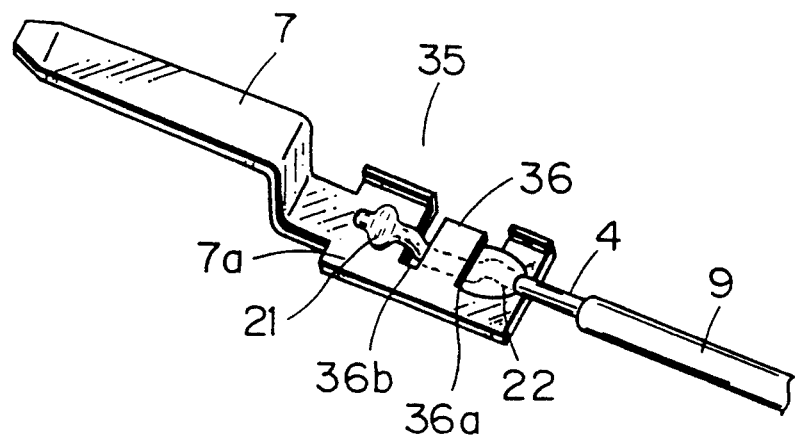
Figure 5B:
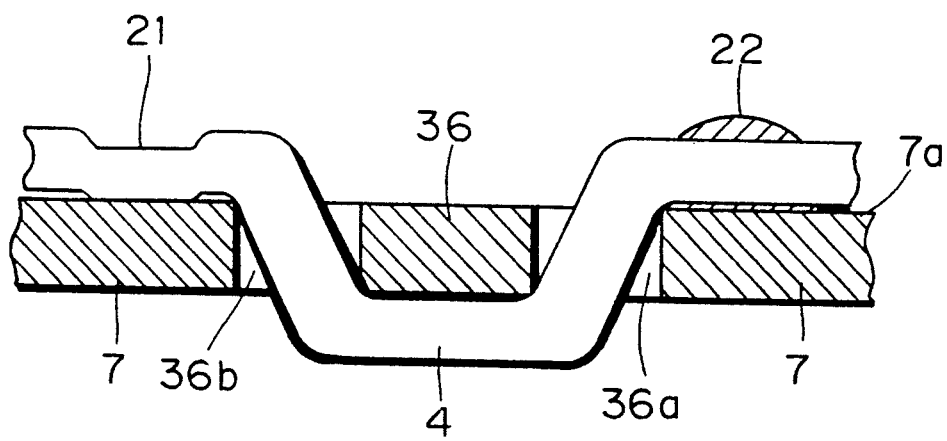
Figure 6:
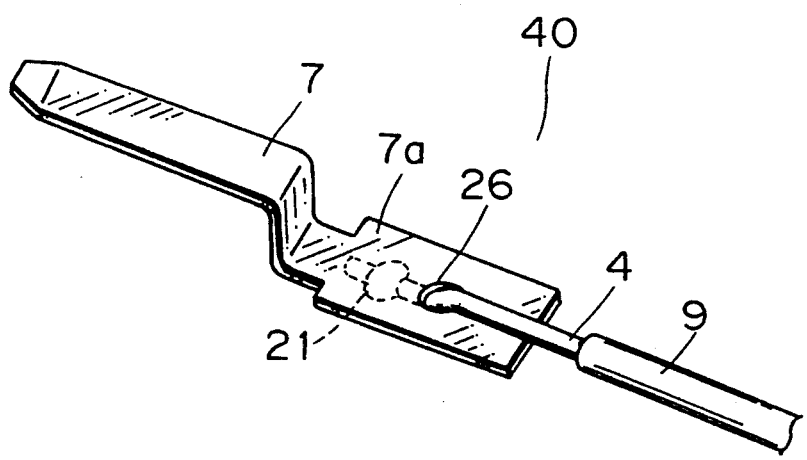
FIGS. 6–9 show a fifth, sixth, and seventh embodiments, respectively.
Figure 7:
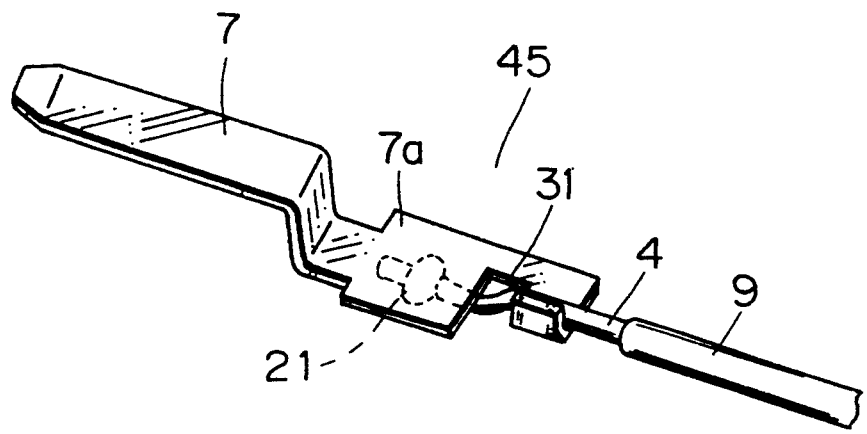
Figure 8:
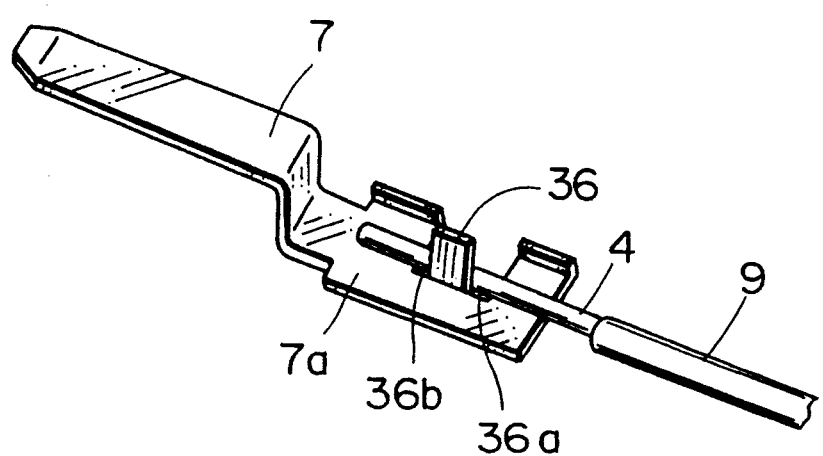
Figure 9:
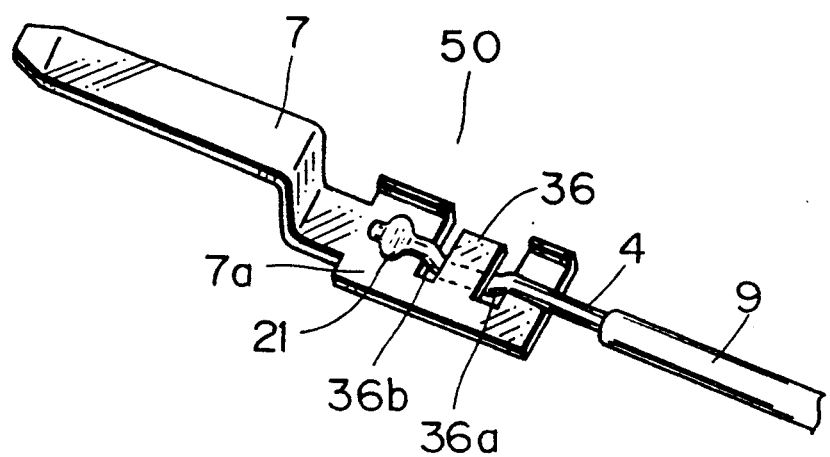
Figure 10:
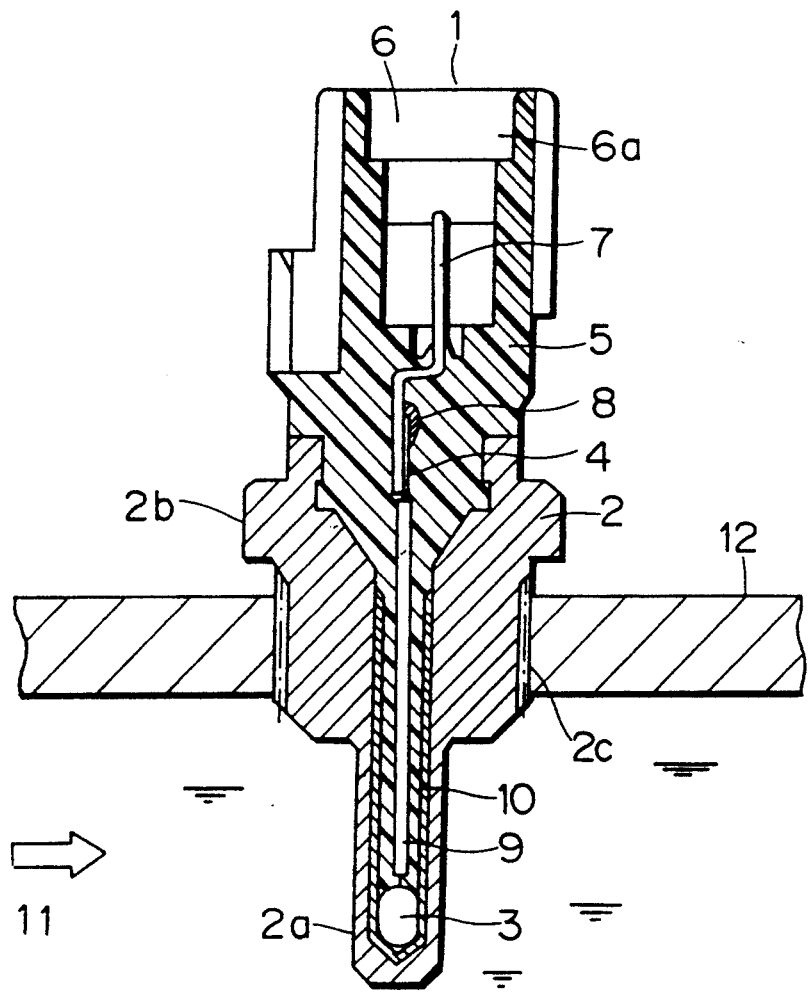
FIG. 10 shows a conventional temperature sensor used for measuring the temperature of cooling water of an automobile.
Figure 11:
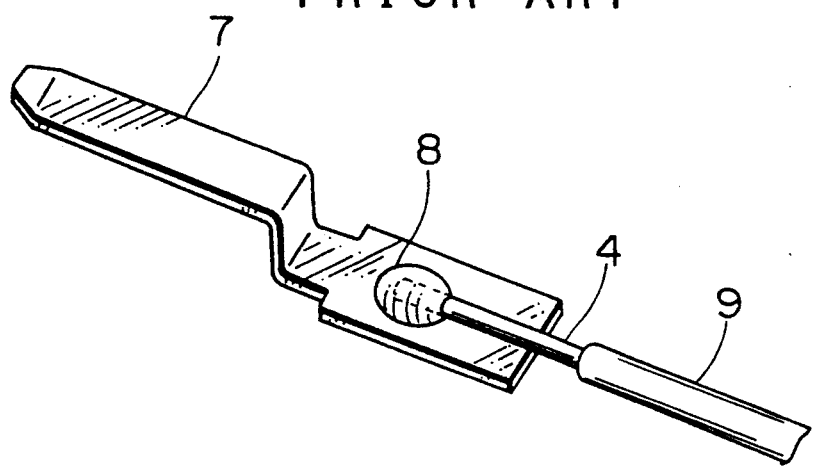
FIG. 11 shows an elongated plate like terminal of the prior art sensor.

FIGS. 6-9 show a fifth, sixth and seventh embodiments which are modifications of the second to fourth embodiments shown in FIGS. 2-5 wherein FIGS. 8 and 9 correspond to FIGS. 5A and 5B, respectively. The fifth to seventh embodiments are different from the second to fourth embodiments in that the soldered connections have been omitted for simple construction. The kinked portion of lead 4 at the hole 26 and cutout 31, or a forcibly extruded portion formed by bending back the strap 36 serve as a fastening means to prevent the welded connection from being exerted mechanical loads and stresses by the lead 4 during heat cycle. Of course, the load sustaining characteristics of fifth to seventh embodiments are not as excellent as those with soldered connections. However, this rather simple construction of fifth to seventh embodiments may find some saving and suitable for quantity production. In the fifth to seventh embodiments, the lead 4 may be either welded or soldered at its end portion.

What is claimed is:

1. A temperature sensor, comprising:
a holder for housing a temperature sensing element therein;
a terminal;
an electrical lead wire having a first end portion thereof electrically connected with said temperature sensing element and a second end portion thereof welded to said terminal; and
fastening means for fastening said lead wire to said terminal to receive mechanical loads exerted by said lead wire, said fastening means being provided closer to the temperature sensing element than said second end portion;
said fastening means being a connection at which said lead wire is soldered to said terminal;
said terminal being formed with an opening through which said second end portion of said lead wire extends from a first side of said terminal to a second side of said terminal, said second end portion extending beyond said opening such that said second end portion is welded to said second side of said terminal;
said lead wire being soldered at a position on said terminal on said first side of said terminal closer to said temperature sensing element than said opening to form said fastening means.

2. The temperature sensor as claimed in claim 1, wherein said opening is formed by a hole through which said second end portion of said lead wire extends from said first side of said terminal to said second side of said terminal, said lead wire being soldered at said hole on said first side to form said fastening means.

3. The temperature sensor as claimed in claim 1, wherein said opening is formed by a cutout through which said second end portion of said lead wire extends from said first side of said terminal to said second side of said terminal, said lead wire being soldered at a portion of said terminal closer to said temperature sensing element than said cutout to form said fastening means.

4. A temperature sensor comprising:
a holder for housing a temperature sensing element therein;
a terminal;

an electrical lead wire having a first end portion thereof electrically connected with said temperature sensing element and a second end portion thereof welded to said terminal;

fastening means for fastening said lead wire to said terminal to receive mechanical loads exerted by said lead wire, said fastening means being provided closer to the temperature sensing element than said second end portion; and an opening being formed in said terminal by a first slit and second slit so as to define a strap between said first and second slits;

said lead wire passing through said first slit from a first side of said terminal to a second side of said terminal and then passing through said second slit from said second side to said first side such that the lead is kinked by said strap;

said lead wire being soldered at a portion on said first side of said terminal closer to said temperature sensing element than said strap to form said fastening means.

5. An electrical connector, comprising:

a terminal;

an electrical lead wire having a first end portion and a second end portion, said second end portion being welded to said terminal; and fastening means for fastening said lead wire to said terminal to receive mechanical loads exerted by said lead wire, said fastening means being provided along said lead wire away from said second end portion;

said fastening means being a connection at which said lead wire is soldered to said terminal;

said terminal being formed with an opening through which said second end portion of said lead wire extends from a first side of said terminal to a second side of said terminal, said second end portion extending beyond said opening such that said second end portion is welded to said second side of said terminal;

said lead wire being soldered at a position on said terminal on said first side of said terminal to form said fastening means.

6. The electrical connector as claimed in claim 5, wherein said opening is formed a hole through which said second end portion of said lead wire extends from said first side of said terminal to said second side of said terminal, said lead wire being soldered at said hole on said first side to form said fastening means.

7. The electrical connector as claimed in claim 5, wherein said opening is formed by a cutout through which said second end portion of said lead wire extends from said first side of said terminal to said second side of said terminal, said lead wire being soldered at a portion of said terminal on said first side to form said fastening means.

8. An electrical connector comprising:

a terminal;

an electrical lead wire having a first end portion and a second end portion, said second end portion being welded to said terminal;

fastening means for fastening said lead wire to said terminal to receive mechanical loads exerted by said lead wire; and an opening being formed in said terminal by a first slit and second slit so as to define a strap between said first and second slits;

said lead wire passing through said first slit from a first side of said terminal to a second side of said terminal and then passing through said second slit from said second side to said first side such that the lead is kinked by said strap;

said lead wire being soldered at a portion on said first side of said terminal to form said fastening means.

* * * * *